United States Patent [19]
Chen

[11] Patent Number: 5,737,208
[45] Date of Patent: Apr. 7, 1998

[54] MODULAR UNINTERRUPTABLE POWER SUPPLY SYSTEM

[76] Inventor: Sung-chin Chen, 1st Fl., No. 19, Lane 456 Chilin Rd., Taipei, Taiwan

[21] Appl. No.: 653,129

[22] Filed: May 24, 1996

[51] Int. Cl.$^6$ ................................................ H02M 7/538
[52] U.S. Cl. .......................... 363/133; 363/24; 363/55
[58] Field of Search ............................ 363/16, 24, 25, 363/26, 123, 124, 131, 132, 133, 134, 50, 55, 56; 307/64, 65, 66

[56] References Cited

U.S. PATENT DOCUMENTS

| | | | |
|---|---|---|---|
| 4,728,808 | 3/1988 | Bet-Esh et al. | 307/66 |
| 4,823,247 | 4/1989 | Tamoto | 363/16 |
| 5,115,205 | 5/1992 | Holmes, Jr. | 330/10 |
| 5,519,306 | 5/1996 | Itoh et al. | 363/26 X |

*Primary Examiner*—Peter S. Wong
*Assistant Examiner*—Y. J. Han

*Attorney, Agent, or Firm*—Testa, Hurwitz & Thibeault, LLP

[57] ABSTRACT

An uninterruptable power supply module includes a DC power supply having an output for outputting a first DC voltage signal, a battery backup module in parallel connection to the output of the DC power supply and having an identical voltage level to that of the first DC voltage signal, boost converter means having an input coupled to the first DC voltage signal from the battery backup module for converting said first DC voltage signal to a second DC voltage signal, DC/AC conversion means having an input coupled to the second DC voltage signal from the boost converter means and an output for generating a first AC voltage signal in response to a variable duty cycle oscillation signal, pulse width modulator means powered by said battery backup module and having an output coupled to said DC/AC conversion means for generating said variable duty cycle oscillation signal, and shaping means having an input coupled to the first AC voltage signal from the DC/AC conversion means and an output for supplying a second AC voltage signal.

5 Claims, 12 Drawing Sheets

MODULAR UNINTERRUPTABLE POWER SUPPLY SYSTEM

BACKGROUND OF THE INVENTION

The present invention relates to an uninterruptable power supply (UPS), and particularly to a modular uninterruptable power supply system.

Uninterruptable power supply (UPS) systems are well known in the art. Such existing systems, however, only output square waves or simulated sine waves, which will damage the electrical apparatus. Further, as the conventional UPS systems apply a transformer as an output stage, they cannot be operated in a parallel connection due to the differences between current, impedance, and frequencies related thereto, which cause a short circuit if they are in parallel connection. Thus, the conventional UPS system cannot be extendible or it will be burned out if attempted to be done so.

SUMMARY OF THE INVENTION

An object of the present invention is to provide an uninterruptable power supply system which can operate in parallel.

According to the present invention, An uninterruptable power supply module includes a DC power supply having an output for outputting a first DC voltage signal, a battery backup module in parallel connection to the output of the DC power supply and having an identical voltage level to that of the first DC voltage signal, boost converter means having an input coupled to the first DC voltage signal for converting said first DC voltage signal to a second DC voltage signal, DC/AC conversion means having an input coupled to the second DC voltage signal from the boost converter means and an output for generating a first AC voltage signal in response to a variable duty cycle oscillation signal, pulse width modulator means having an output coupled to said DC/AC conversion means for generating said variable duty cycle oscillation signal, and shaping means having an input coupled to the first AC voltage signal from the DC/AC conversion means and an output for supplying a second AC voltage signal.

Other objects, advantages, and novel features of the invention will become more apparent from the following detailed description when taken in conjunction with the accompanying drawings.

DETAILED DESCRIPTION OF THE PREFERRED EMBODIMENTS

Figure 1:
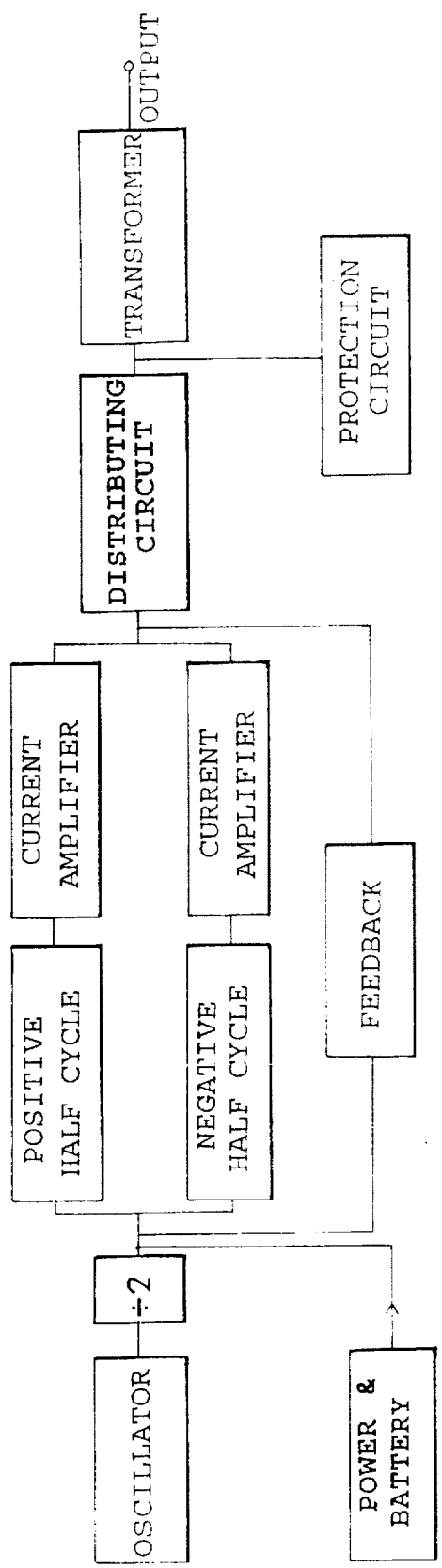
FIG. 1 is a block diagram of a conventional uninterruptable power supply.

Referring to FIG. 1, a block diagram of a conventional uninterruptable power supply (UPS) is shown. As those skilled in the art are familiar with the operation principles, a detailed description of the signals paths and functions of various blocks need not be undertaken. However, the most important point is that the output stage of the circuit applies a transformer, thus, conventional UPSs cannot operate in parallel, if the instantaneous polarities of the transformers are not equal.

Figure 2:
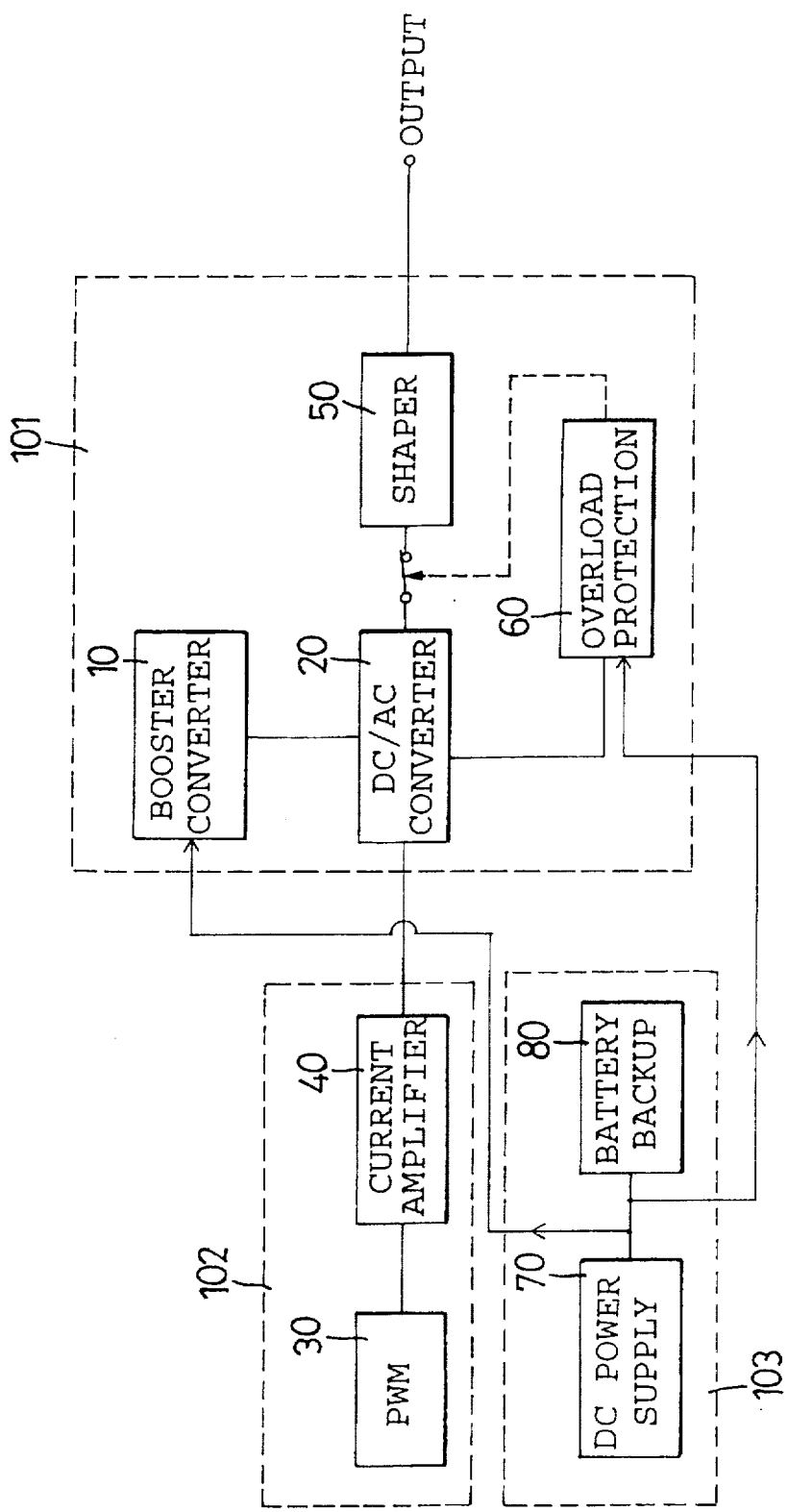
FIG. 2 is a block diagram of an uninterruptable power supply module according to the present invention.

A block diagram of the modular UPS of the present invention is shown in FIG. 2. The UPS can be divided into three portions: an AC generating circuit 101, a controlling circuit 102, and a power circuit 103. The modular UPS includes a booster converter circuit 10 for converting a DC voltage signal, such as 24 volts, from a first DC power supply or from a battery backup circuit to a second DC voltage signal, such as 170 volts, a DC/AC converter circuit 20 for converting said second DC voltage signal to a first AC voltage signal in a magnitude of about 170 volts, a pulse width modulator (PWM) circuit 30 for generating a variable duty cycle oscillation signal to control a frequency of the output AC voltage signal of the DC/AC conversion circuit 20 via a current amplifier 40, a shaper 50 for shaping the output voltage signal from the DC/AC converter circuit 20 into a sine voltage signal of 120 volts, and an overload protection circuit 60 for receiving a signal from the DC/AC converter circuit 20 to disconnect the output of the DC/AC converter circuit 20 when the signal therefrom exceeds a predetermined value. The modular UPS further includes a DC power supply circuit 70 and a battery backup circuit 80 for providing all of the power required by the circuits mentioned.

Figure 3:
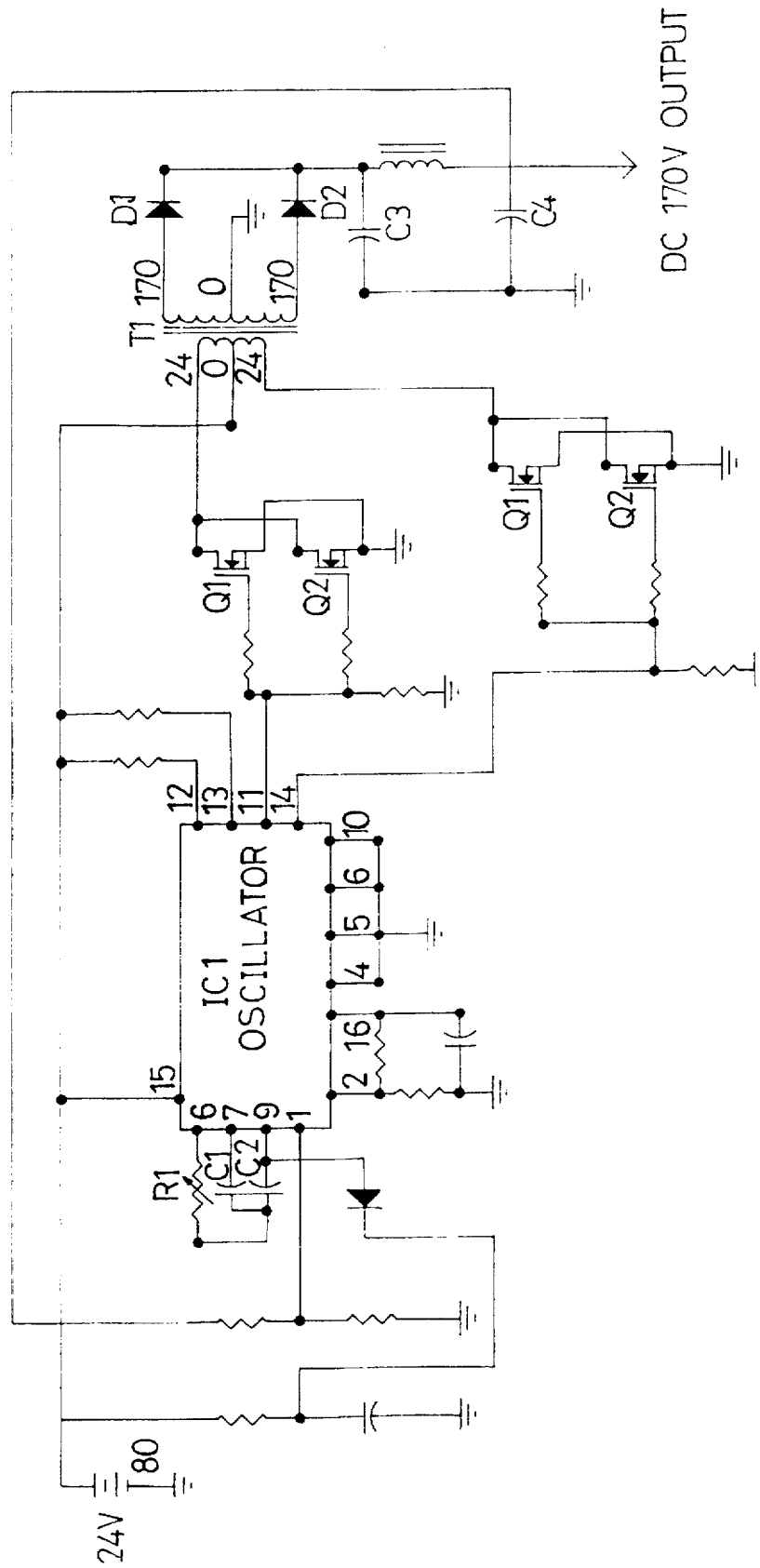
FIG. 3 is a circuit diagram of a boost converter of FIG. 2.

Referring to FIG. 3, the booster converter circuit 10 includes an oscillator IC1 having pins 1–16 with pin 15 connected to a DC power source of 24 volts from the battery backup circuit 80 or from the DC power supply circuit 70 for respectively generating a positive half cycle signal and a negative half cycle signal in pins 11, 14, a variable resistor R1 in cooperation with two capacitors C1, C2 connected to pins 6, 7, and 9 of the oscillator IC1 for controlling the output signal in a frequency range of 25 KHz±1 Hz, two drivers each composed of two parallel connected N channel MOSFETs Q1, Q2 connected to pins 11, 14 of the oscillator IC1, a transformer T having a primary winding connected to the outputs of the drivers and a secondary winding for outputting a voltage signal of 170 volts with a frequency of 25 KHz, and a full wave rectifier composed of two diodes D1, D2, a choke RFC, two capacitors C3, C4 for outputting a signal of 170 volts DC.

Figure 4:
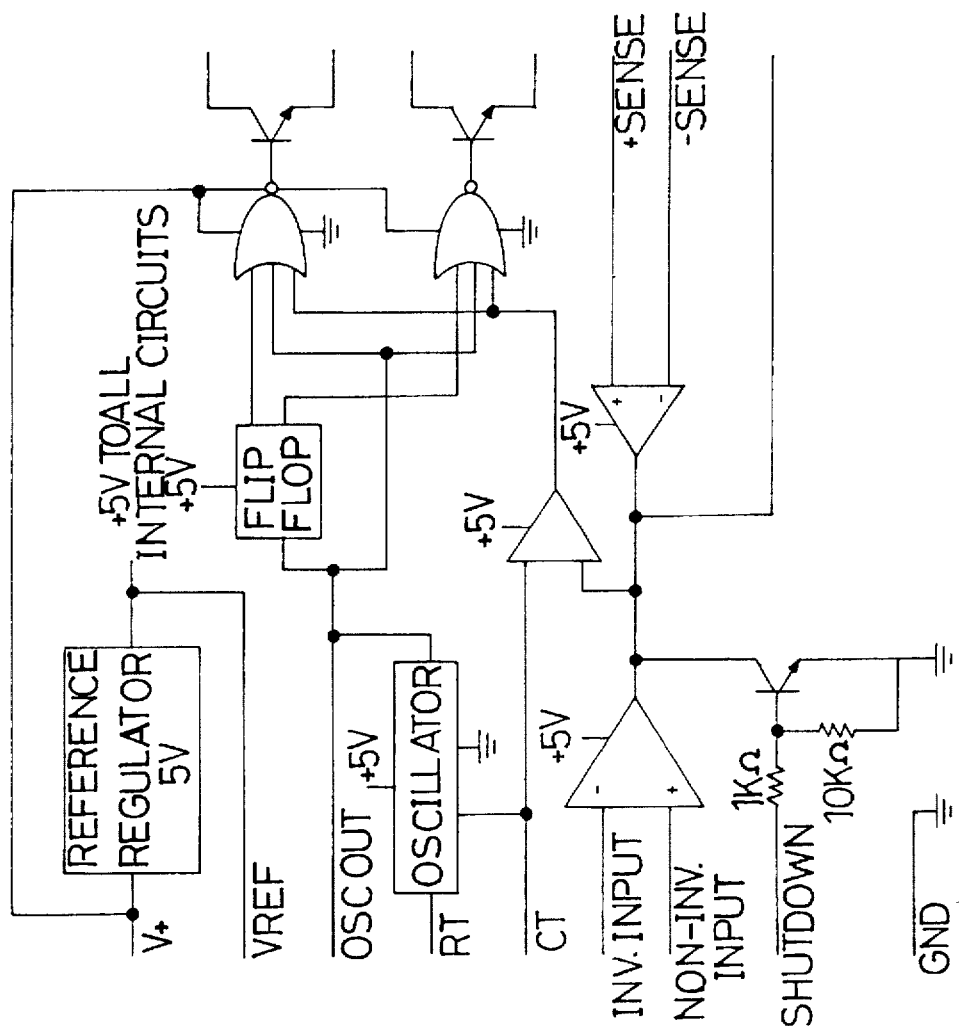
FIG. 4 is a circuit diagram of an oscillator in FIG. 3

Referring to FIG. 4, the oscillator IC1 is preferably a model CA3524 manufactured by Harris Semiconductor Corporation. The IC1 includes a Zener voltage reference, a transconductance error amplifier, a precision R-C oscillator, a pulse width modulator, a pulse-steering flip-flop, two alternating output switches, and current-limiting and shutdown circuitry. As this IC is already commercially available, it is therefore not detailed here for the sake of brevity.

Figure 5:
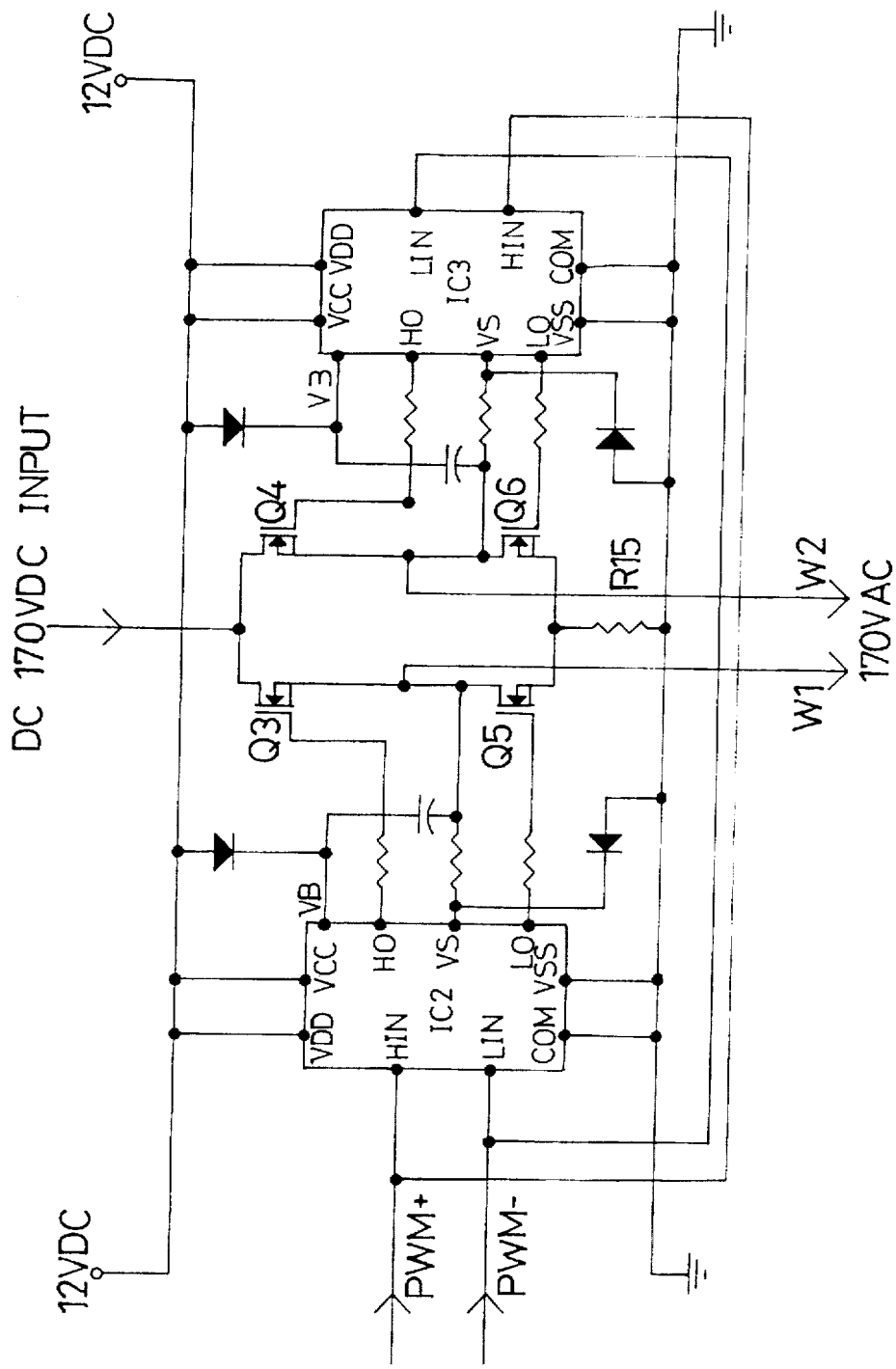
FIG. 5 is a circuit diagram of a DC/AC converter of FIG. 2.

FIG. 5 is a DC/AC converter 20 which includes a bridge type switching circuit, wherein the output is taken from the coupling between the central portion of each leg thereof. Each leg comprises a pair of switching devices coupled in series relation which are operated alternately. A resistor R15 is coupled between the legs and a ground. Each of the respective four MOSFETs Q3, Q4, Q5, and Q6 have their respective gates coupled to the output terminals HO, LO of the controllers IC2, IC3. The input terminals LIN, HIN of the controllers IC2, IC3 are coupled with the output terminals PWM+', PWM-' (shown in FIG. 9 of the current amplifier 40 as mentioned in FIG. 2.

The controllers IC2, IC3 control the operation of each of the four MOSFETs Q3–Q6 such that the MOSFETs Q3, Q6 are turned on during one portion of an AC cycle and MOSFETs Q4, Q5 are operated during an alternate half cycle, to provide a pulse-width-modulated voltage signal with bi-directional current through the output lines W1, W2.

Figure 6:
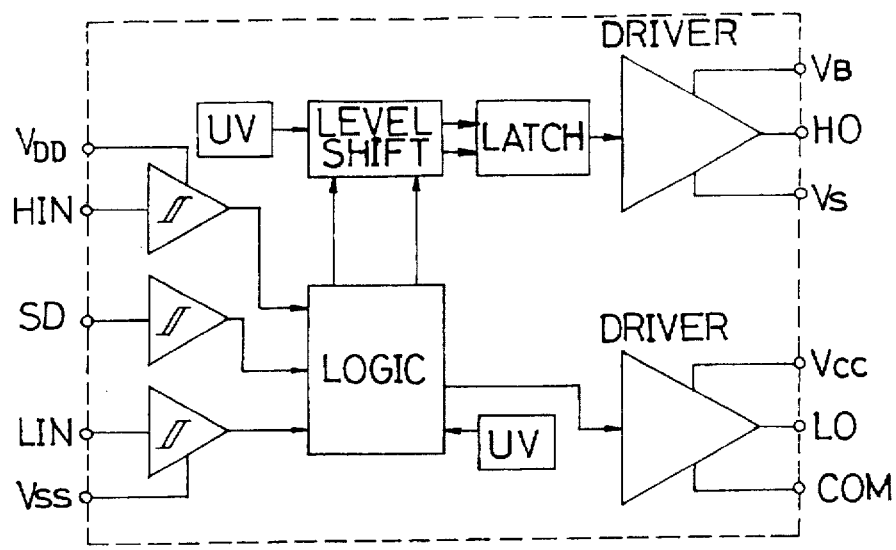
FIG. 6 is a block diagram of a driver in FIG. 5.

Referring to FIG. 6, the controllers IC2, IC3 are preferably a model HIP2500 manufactured by Harris Semiconductor Corporation. As this IC is already commercially available, it is therefore not detailed here for the sake of brevity.

Figure 7:
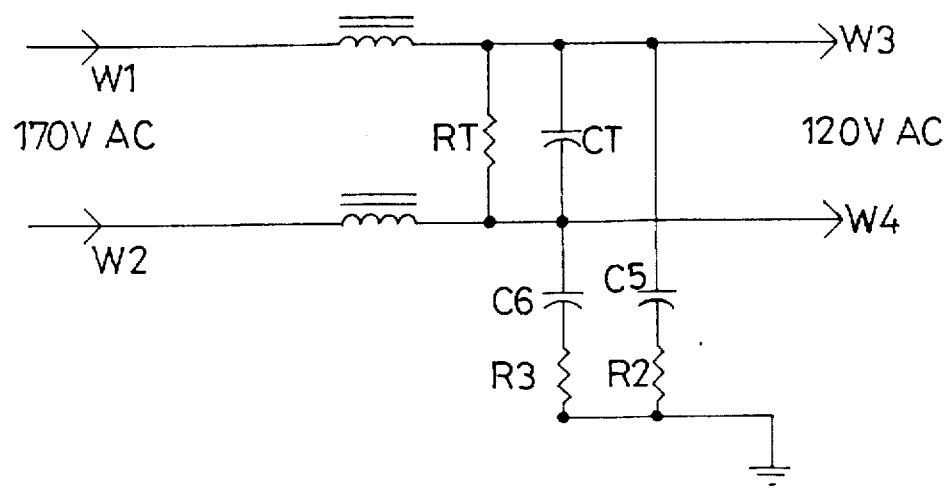
FIG. 7 is a circuit diagram of a rectifier of FIG. 2.

The circuit diagram of a shaper 50 according to the present invention is shown in FIG. 7. The shaper 50 receives a 170 volts pulse-width-modulated voltage signal from the output lines W1, W2 of the DC/AC converter 20 and shapes the voltage signal to a 120 volts sine voltage signal. The shaper 50 is composed of three resistor R2, R3, and RT and three capacitors C5, C6, and CT connected in a low-pass filter configuration. The input signal from the DC/AC converter 20 will be shaped by the resistor RT and the capacitor CT and an approximate sine voltage signal will be derived at the output terminals W3, W4 of the shaper 50. As the time constant of RT, CT is 1.414, the sine voltage signal will be 170/1.414=120 volts.

Figure 8:
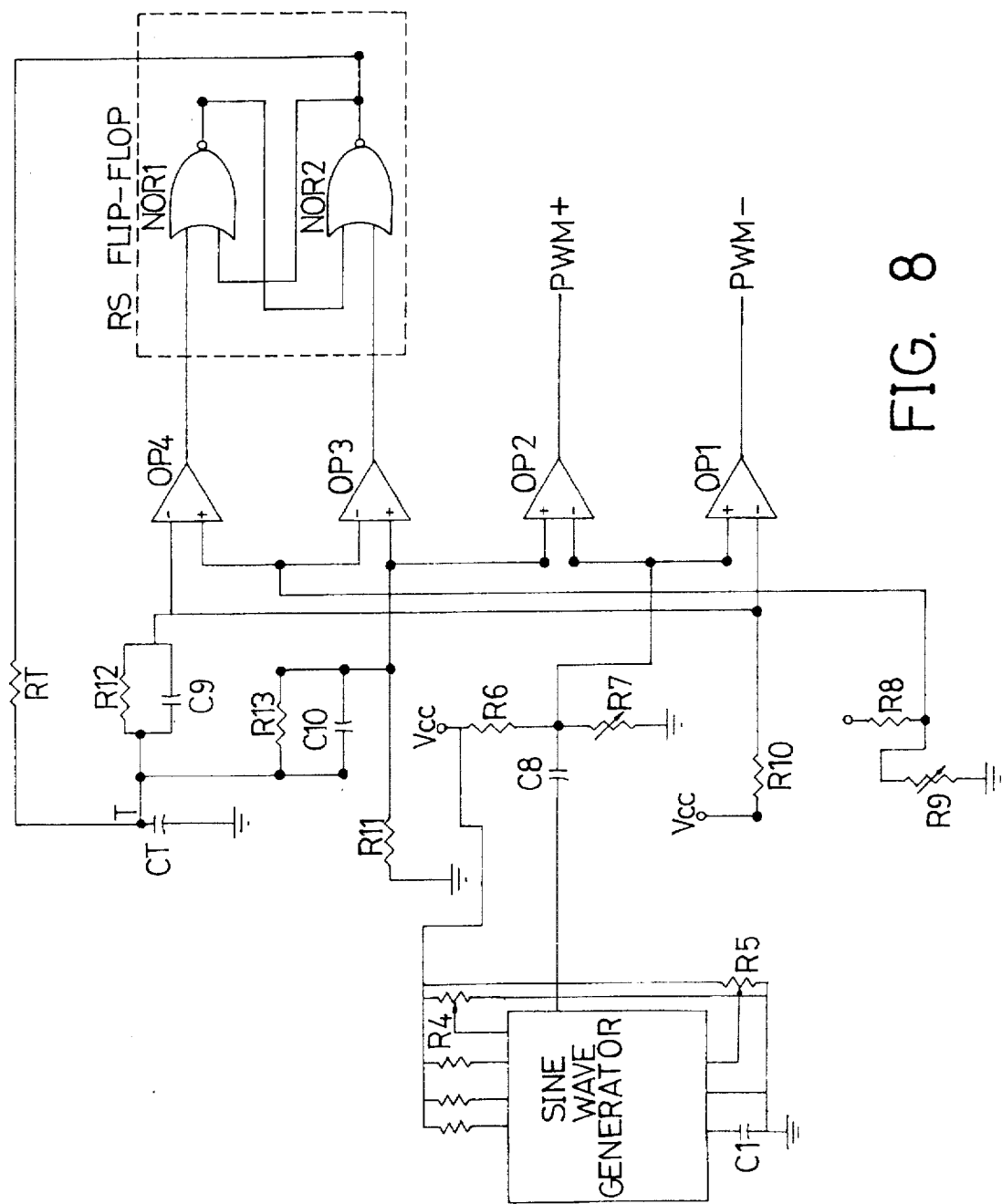
FIG. 8 is a circuit diagram of a pulse width modulator of FIG. 2.
Figure 10:
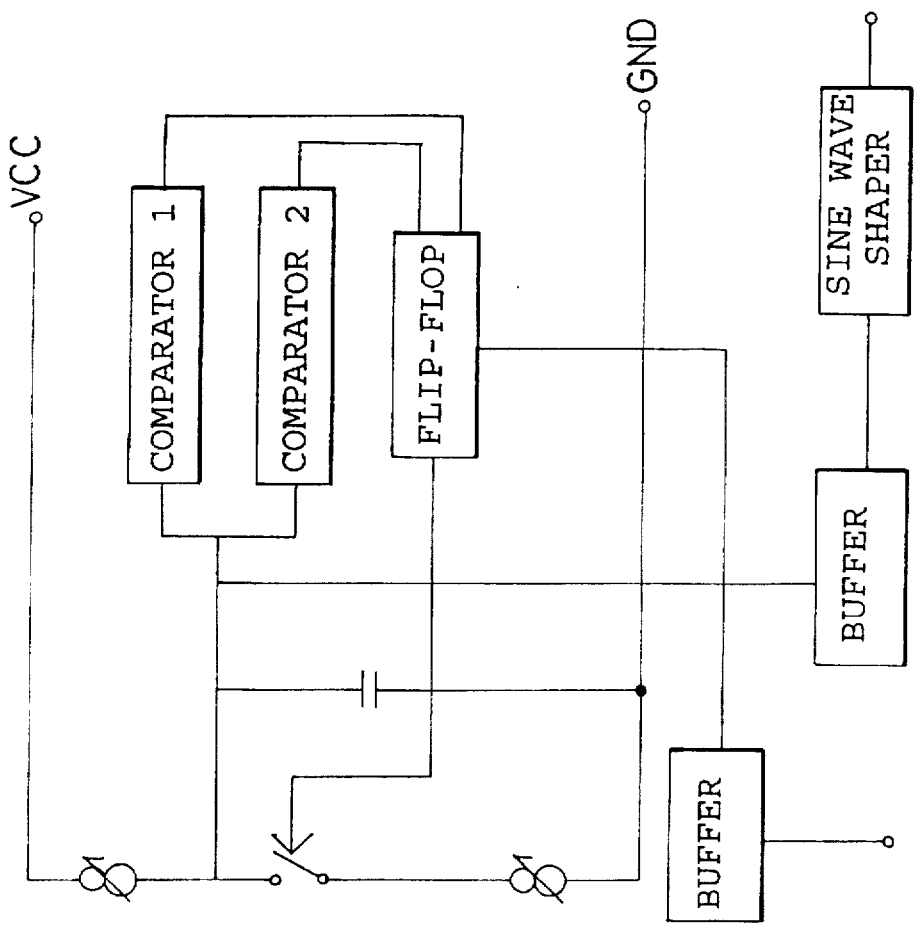
FIG. 10 is a block diagram of a sine wave generator in FIG. 9.

The pulse width modulator (PWM) 30 according to the present invention is shown in FIG. 8. The PWM 30 includes a sine wave generator IC4 for generating a sine wave signal in a frequency of 60±1 Hz, which is determined by two resistors R4, R5 and a capacitor C7, four operational amplifiers OP1, OP2, OP3, and OP4, and two NOR gates NOR1, NOR2 connected in an RS flip-flop configuration blocked by dashed lines. The sine wave generator IC4 is preferably a model L8038 manufactured by Harris Semiconductor Corporation. The block diagram of IC4 is shown in FIG. 10 and as this IC is already commercially available, therefore a detailed description thereof is not undertaken. An output signal of the sine wave generator IC4 is transmitted to a non-inverted input of the operational amplifier OP1 and an inverted input of the operational amplifier OP2 via a capacitor C8, a voltage divider composed of two resistors R6, R7 is provided between the capacitor C8 and the inverted input of the operational amplifier OP2. A voltage divider composed of two resistors R8, R9 has an output connected to an inverted input of the OP3 and a non-inverted input of the operational amplifier OP4. Inverted inputs of the operational amplifiers OP1, OP4 are coupled to a power source VCC via a resistor R10 and a non-inverted input of the operational amplifier OP3 is grounded via a resistor R11. The outputs of the operational amplifiers OP3, OP4 are respectively coupled to inputs of the RS flip-flop for generating a square wave at an output thereof. The output of the RS flip-flop is then grounded via a series-connected resistor RT and capacitor CT, then a triangular wave signal may be derived from a node T between the resistor RT and the capacitor CT. The triangular wave signal is then transmitted to the inverted input of the operational amplifier OP1 via a resistor R12 and a capacitor C9 coupled in parallel. The triangular wave signal is also transmitted to the non-inverted input of the operational amplifier OP2 via a resistor R13 and a capacitor C10. In this arrangement, the operational amplifiers OP1, OP2 will respectively output a pulse width modulated signal PWM+ and a pulse width modulated signal PWM− after the comparison of the triangular wave signal and the sine wave signal.

Figure 9:
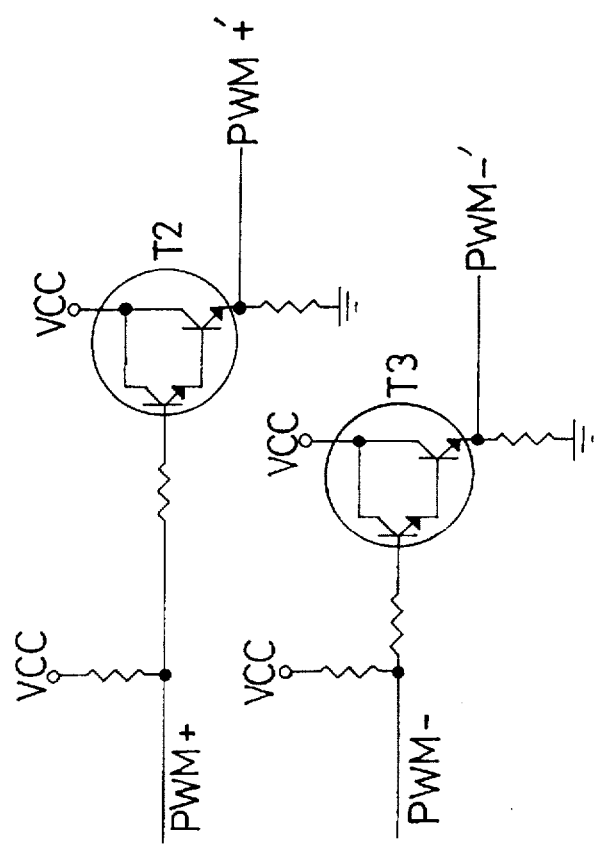
FIG. 9 is a circuit diagram of a current amplifier of FIG. 2.

Referring to FIG. 9, the current amplifier 40 according to the present invention includes a first Darlington amplifier T2 for receiving the pulse width modulated signal PWM+ from the operational amplifier OP2 and outputting a signal PWM+' to the DC/AC converter 20 and a second Darlington amplifier T3 for receiving the pulse width modulated signal PWM− from the operational amplifier OP1 and outputting a signal PWM−' to the DC/AC converter 20 as mentioned in FIG. 3.

Figure 11:
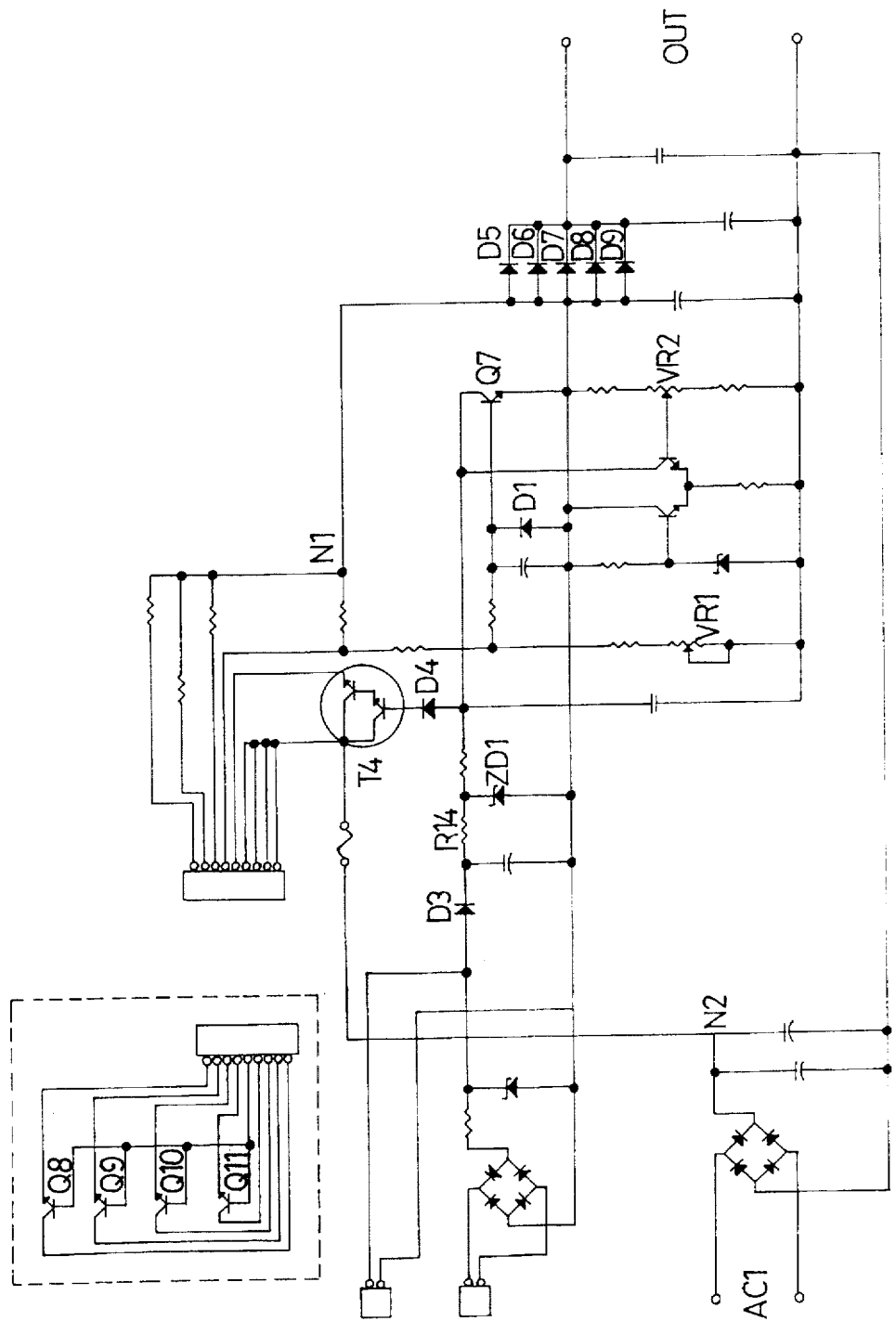
FIG. 11 is a circuit diagram of a power supply module according to the present invention.

Referring to FIG. 11, a power supply circuit according to the present invention includes two input terminals, one is AC-HIN and the other is AC1, a suitable input voltage of the AC-HIN is 12 volts AC, then the input signal is supplied to a diode D3 for half-wave rectification. The rectified signal is then supplied to a current-limiting resistor R14 and transmitted to a Zener diode ZD1 for acquiring a regulated DC 6 Volts, which supplies a biasing voltage to a diode D4 and a transistor Q7. Thus, the base currents of transistors Q8–Q11, which are connected to the diode D4 via a Darlington amplifier T4, will be increased, then a regulated output voltage will be acquired at a node N1 as shown.

A suitable input signal for the AC1 is 38 volts AC, then the input signal is supplied to a bridge rectifier BD2, then a 50 volts DC signal will be derived at a node N2 as shown. A variable resistor VR2 connected as shown is provided for controlling the output voltage of the circuit to a voltage of about 25 volts. A variable resistor VR1 connected as shown is provided for controlling the output current of the circuit to a current of 10 amperes. Five diodes D5–D9 connected in parallel are coupled between the node N1 and the output terminal OUT of the circuit.

Figure 12:
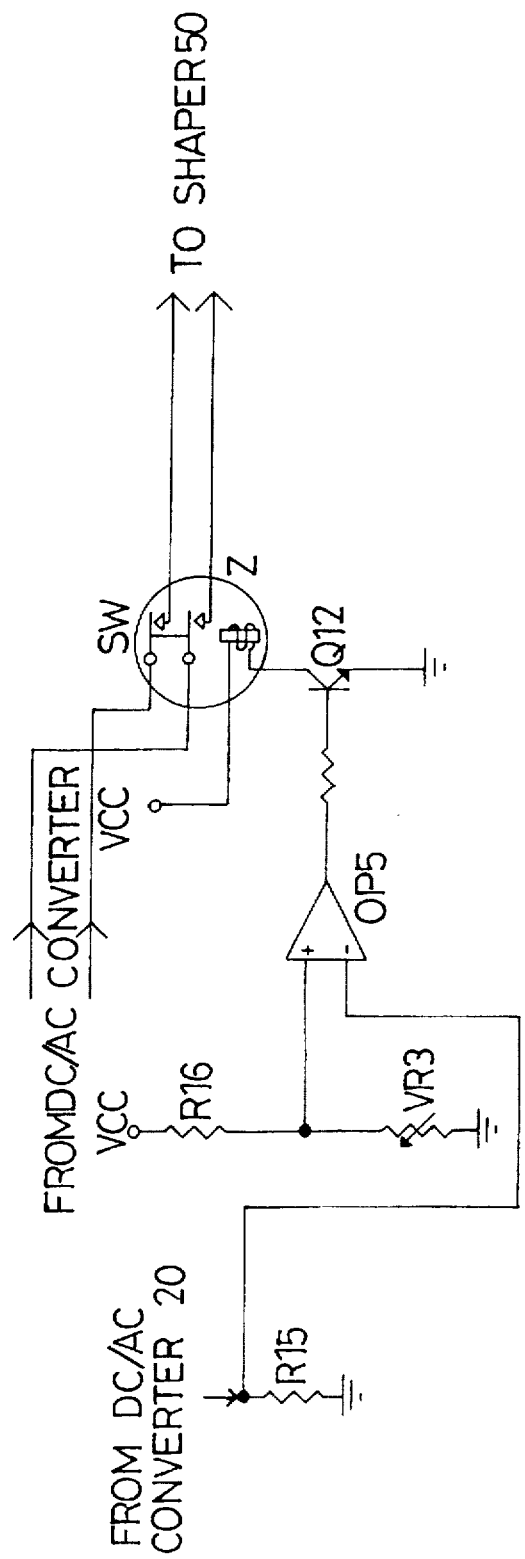
FIG. 12 is a circuit diagram of an overload protection circuit in FIG. 2.

FIG. 12 is an overload protection circuit 60 according to the present invention, the overload protection circuit 60 includes an operational amplifier OP5 having an inverted input receiving a voltage signal on the resistor R15 in DC/AC converter 20 and a non-inverted input receiving a reference voltage from a voltage divider composed of a resistor R16 and a variable resistor VR3, a transistor Q12 having a base coupled with an output of the operational amplifier OP5, and a relay Z having a coil coupled with a collector of the transistor Q12 and a double throw switch SW coupled between the DC/AC converter 20 and the shaper 50 as shown in FIG. 2. When the voltage on the resistor R15 is greater than the reference voltage, preferably 1.4 volts DC, then the transistor Q12 will be turned on and the relay Z will be activated to have the switch SW disconnected.

Figure 13:
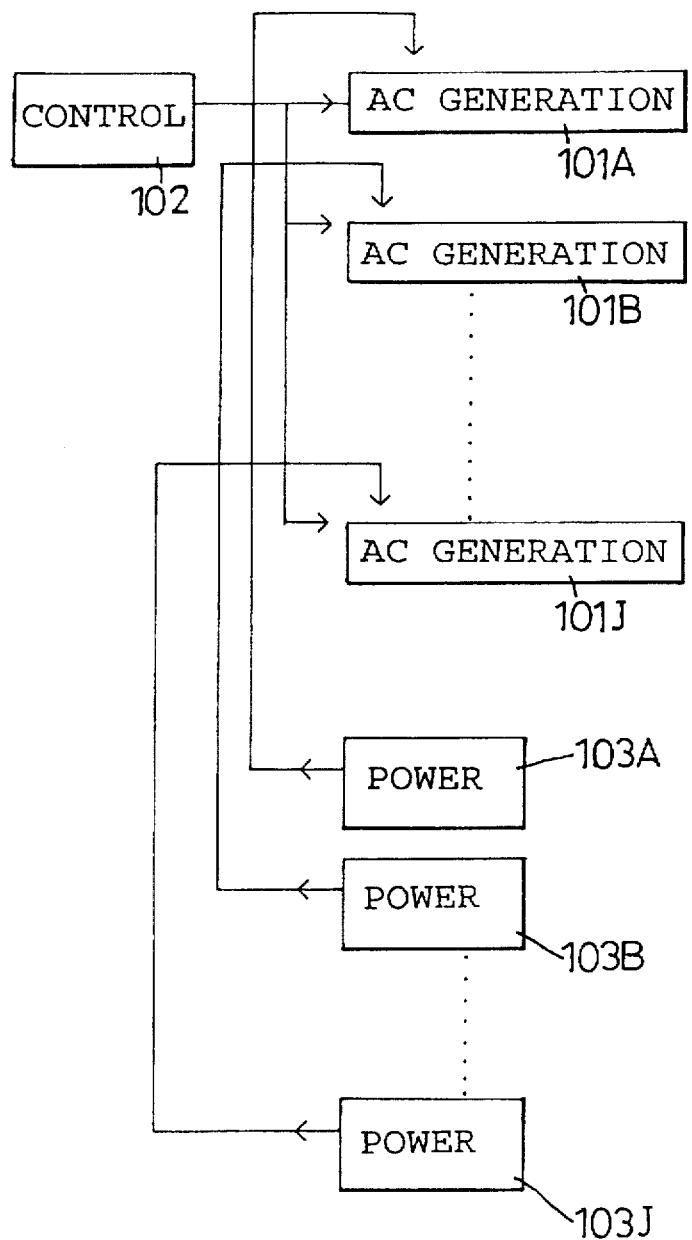
FIG. 13 is a block diagram of an uninterruptable power supply system according to the present invention.

Referring to FIG. 13, a UPS system includes ten AC generating circuits 101A–101J, a control circuit 102, and ten power circuit 103A–103J. Each of the power circuit 103A–103J supplies power to a corresponding AC generating circuit 101A–101J. In this arrangement, a desired 2000 watts of output may be achieved without the disadvantages in the conventional UPSs.

Although the invention has been explained in relation to its preferred embodiment, it is to be understood that many other possible modifications and variations can be made without departing from the spirit and scope of the invention as hereinafter claimed.

What is claimed is:

1. An uninterruptable power supply module, comprising:
   a DC power supply having an output for outputting a first DC voltage signal;
   a battery backup module in parallel connection to the output of the DC power supply and having an identical voltage level to that of the first DC voltage signal;
   boost converter means having an input coupled to the first DC voltage signal for converting said first DC voltage signal to a second DC voltage signal;
   DC/AC conversion means having an input coupled to the second DC voltage signal from the boost converter means and an output for generating a pulse-width-modulated voltage signal in response to a variable duty cycle oscillation signal;
   pulse width modulator means having an output coupled to said DC/AC conversion means for generating said variable duty cycle oscillation signal;
   shaping means having an input coupled to the pulse-width-modulated voltage signal from the DC/AC conversion means and an output for supplying a sine voltage signal; and
   overload protection means having a first input coupled to the DC/AC conversion means for receiving a detection signal therefrom and a second input coupled to the battery backup module for receiving a reference signal therefrom and generating a trip signal to disconnect the input of the shaping means when a voltage level of the detection signal from the DC/AC conversion means is higher than a voltage level of the reference signal.

2. The uninterruptable power supply module according to claim 1 further comprising a current amplifier provided between the pulse width modulator and the DC/AC conversion means.

3. The uninterruptable power supply module according to claim 1, wherein said boost converter means has an oscillator with an input coupled to the battery backup module, a first output and a second output for respectively generating a positive half cycle and a negative half cycle of an output signal, a current amplifier stage having a first input and a second input coupled to the outputs of the oscillator and a first output and a second output, a transformer having a low voltage winding coupled to the outputs of the current amplifier and a high voltage winding for outputting an AC voltage signal, and a rectifier coupled to the AC voltage signal for rectifying the voltage signal to the second DC voltage signal.

4. The uninterruptable power supply module according to claim 3, wherein said second DC voltage signal is 170 volts.

5. The uninterruptable power supply module according to claim 1, wherein said DC/AC conversion means is composed of a first driver and a second driver each having two inputs respectively coupled to the variable duty cycle oscillation signal from the pulse width modulation means and a first output and a second output and a bridge amplifier having a first input coupled to the second DC voltage signal from the boost converter means, a second input, a third input, a fourth input, and a fifth input respectively coupled to the outputs of the drivers, and an output for outputting the first AC voltage signal.

\* \* \* \* \*